United States Patent
Tröbst

(10) Patent No.: US 9,945,429 B2
(45) Date of Patent: Apr. 17, 2018

(54) CLUTCH HAVING A TUNING ELEMENT FOR INFLUENCING THE ACOUSTIC BEHAVIOUR OF THE CLUTCH

(71) Applicant: MAN Truck & Bus AG, München (DE)

(72) Inventor: Steffen Tröbst, Waldeck (DE)

(73) Assignee: MAN Truck & Bus AG, München (DE)

( * ) Notice: Subject to any disclaimer, the term of this patent is extended or adjusted under 35 U.S.C. 154(b) by 0 days.

(21) Appl. No.: 15/294,129

(22) Filed: Oct. 14, 2016

(65) Prior Publication Data

US 2017/0108053 A1    Apr. 20, 2017

(30) Foreign Application Priority Data

Oct. 15, 2015 (DE) .................. 10 2015 013 428

(51) Int. Cl.
*F16D 13/58* (2006.01)
*F16D 13/52* (2006.01)
*F16D 25/0638* (2006.01)

(52) U.S. Cl.
CPC ............. *F16D 13/58* (2013.01); *F16D 13/52* (2013.01); *F16D 25/0638* (2013.01); *F16D 2300/22* (2013.01)

(58) Field of Classification Search
CPC ...... F16D 13/52; F16D 13/58; F16D 2300/22; F16D 25/0638
See application file for complete search history.

(56) References Cited

U.S. PATENT DOCUMENTS

| 5,611,415 | A | * | 3/1997 | Davis | F01P 7/085 192/18 A |
| 5,613,586 | A | * | 3/1997 | Schilling | F01P 7/085 192/48.3 |
| 7,591,357 | B2 | * | 9/2009 | Antchak | F16D 41/206 192/41 S |
| 7,992,696 | B2 | * | 8/2011 | Mahlberg | F16D 13/52 192/105 CD |
| 9,097,335 | B2 | * | 8/2015 | Serkh | F16D 7/022 |
| 2007/0042916 | A1 | * | 2/2007 | Iyer | C10M 141/10 508/110 |
| 2009/0078526 | A1 | * | 3/2009 | Kawatsu | F16D 13/56 192/70.23 |
| 2012/0015768 | A1 | * | 1/2012 | Serkh | F16H 55/36 474/94 |

(Continued)

FOREIGN PATENT DOCUMENTS

| CN | 102237745 A | 11/2011 |
| CN | 202144839 U | 2/2012 |

(Continued)

OTHER PUBLICATIONS

European Search Report issued in corresponding application No. 16001881.8 dated Mar. 28, 2017.

*Primary Examiner* — Jacob S. Scott
*Assistant Examiner* — Tinh Dang
(74) *Attorney, Agent, or Firm* — Carter, DeLuca, Farrell & Schmidt, LLP

(57) ABSTRACT

The present disclosure relates to a clutch, in particular a multiple disc clutch, having an outer clutch part, and an inner clutch part and a tuning element encasing the outer clutch part and influencing the acoustic behavior of the clutch.

14 Claims, 3 Drawing Sheets

(56) References Cited

U.S. PATENT DOCUMENTS

2016/0084323 A1* 3/2016 Cortright ............. F16F 15/126
192/79

FOREIGN PATENT DOCUMENTS

| CN | 203809534 U | 9/2014 |
|----|-------------|--------|
| CN | 205401583 U | 7/2016 |
| DE | 1725998 U1 | 2/1979 |
| DE | 19701178 A1 | 7/1998 |
| EP | 1619390 A2 | 1/2006 |
| KR | 10-0931445 B1 | 12/2009 |

* cited by examiner

CLUTCH HAVING A TUNING ELEMENT FOR INFLUENCING THE ACOUSTIC BEHAVIOUR OF THE CLUTCH

FIELD OF THE DISCLOSURE

The present disclosure relates to a clutch, in particular a multiple disc clutch, preferably for a transmission of torques, expediently vibratory torques, with, in particular, a pronounced rotational irregularity between an engine and a drive unit.

BACKGROUND

Multiple disc clutches consist generally of a clutch pot, a clutch hub and multiple disc assemblies, in each case one multiple disc assembly being connected in a positively locking manner to the clutch hub and one multiple disc assembly being connected in a positively locking manner to the clutch pot. When the multiple disc assemblies are pressed against one another, a transmission of force takes place from the clutch pot via the multiple disc assemblies to the clutch hub. In order to make switching of the multiple disc clutch possible in order to produce or to disconnect the non-positive connection, there has to be a radial play in the positively locking fit in the positively locking connections of the multiple disc assemblies to their connected components (clutch pot to the one multiple disc assembly and clutch hub to the other multiple disc assembly). This play produces alternating contact of the components which are connected in a positively locking manner, which can lead to, in particular, knocking noise between the flanks of the positively locking connections. The clutch pot, above all, emits frequency components as a result of this transient excitation, which frequency components are directly dependent on the natural modes, natural frequencies and the modal damping of the said natural modes, and correlate with the structure-borne sound components which are produced.

It is an object of the present disclosure to avoid or to reduce undesired clutch noise, and preferably to modify or to tune it to form preferred and/or defined functional/operating noise.

SUMMARY

Advantageous developments of the present disclosure can be gathered from the following description of preferred embodiments.

The present disclosure relates to a clutch, in particular a multiple disc clutch, having an outer clutch part and an inner clutch part. The outer clutch part is preferably a clutch pot, in particular an outer multiple disc carrier. The inner clutch part is preferably a clutch hub, in particular an inner multiple disc carrier.

The outer clutch part and the inner clutch part are preferably arranged substantially coaxially with respect to one another.

The clutch is distinguished, in particular, by the fact that a preferably substantially annular tuning element expediently encases the outer clutch part at least in sections. The tuning element preferably serves to influence the acoustic behaviour of the clutch, in particular the acoustic behaviour of the outer clutch part. Here, the tuning element serves, in particular, to influence the psycho-acoustic behaviour and/or to encase the outer clutch part expediently on the outer side.

It is expediently possible by way of the tuning element that undesired noise of the clutch is reduced and/or is put out of tune to form preferred functional and/or operating noise.

The clutch can be tuned by means of the tuning element, in particular by way of a mass and/or stiffness configuration of the outer clutch part, in such a way that natural vibration modes and/or natural frequencies of the outer clutch part can be set in such a way that airborne sound emission can be minimized and/or can be shifted into a frequency range which is not perceived to be disturbing.

The material and/or the geometry of the tuning element influence/influences its mechanical partial mass, stiffness and/or join damping properties.

The tuning element can expediently put out of tune or modify natural modes and/or natural frequencies of the clutch noise, in particular of the outer clutch part, in such a way that preferred functional and/or operating noise is achieved, for example by virtue of the fact that the acoustic behaviour of the clutch, in particular of the outer clutch part, can be configured by way of damping of the natural modes and/or natural frequencies.

Oscillating systems can expediently be modally described discretely by way of a matrix of n*m coupled spring/mass systems.

The configuration of the acoustic behaviour can take place, in particular, substantially by way of targeted influencing of the pulse loading and/or the modulation of individual clutch noise frequency groups. As an alternative or in addition, emphasis and/or suppression of defined, application-related clutch noise frequency groups can be aimed for by virtue of the fact that, as a result, the degree of fluctuation and/or the roughness of the emitted overall clutch noise can be set by way of the influencing of the modal parameters by way of material and/or join location damping (join damping) and, as an alternative or in addition, the modulus of elasticity and/or shear modulus of the tuning element.

The tuning element makes it possible, in particular, that the mass, stiffness and/or damping matrices of the clutch, in particular of the outer clutch part, which are produced by way of the material and/or join damping and, as an alternative or in addition, the modulus of elasticity and/or the shear modulus can be influenced, expediently independently of the material properties, in such a way that the modal parameters preferably change as a result of the differences with regard to the material and/or join damping and, as an alternative or in addition, the modulus of elasticity and/or the shear modulus in the tuning element and the outer clutch part, in such a way that the psycho-acoustic parameters overall lead to preferred clutch functional or operating noise, with the result that, for example, undesired clutch noise is reduced or avoided.

In order to achieve this in a manner which is independent of the material, in particular independent of the material properties of the outer clutch part, the tuning element can be applied to the outer clutch part in such a way that the join damping between the outer clutch part and the tuning element is influenced (for example, is set) by way of the coefficient of friction between them and/or by means of tangential tension in the outer clutch part and the tuning element. This expediently leads to expediently direct influencing of the damping matrix of the overall arrangement comprising the clutch with the tuning element. In addition, this damping can preferably be selected by way of the selection of the material (in particular, raw material) of the tuning element and its specific material damping.

The join damping in the frictional gap between the outer clutch part and the tuning element is caused, in particular, by way of micro-movements.

The tuning element can be applied to the outer clutch part, preferably in a manner which involves friction, for example can bear against the outer clutch part in a manner which involves friction, for example in the circumferential direction of the outer clutch part.

It is possible that the tuning element is configured from at least two different materials, for example different in relation to mass, stiffness and/or noise damping.

Furthermore, the tangential prestress and elastic characteristic variables (for example, the modulus of elasticity) of the tuning element (in particular, of its raw material or material) can expediently influence the stiffness matrix of the outer clutch part with the applied tuning element.

The tuning element can comprise, for example, an elastomer, different elastomers, a thermoset material, different thermoset materials, a thermoplastic material and/or different thermoplastic materials. In addition, for example, at least one material additive, a strength-increasing additive and/or fibres can be incorporated into the material.

The tuning element can expediently have different layer thicknesses. As an alternative or in addition, the tuning element can have an expediently different partial mass distribution. It can therefore comprise a different layer thickness and/or partial mass distribution in at least two part sections. As a result, in particular, the mass matrix of the combination of the outer clutch part and the tuning element can be influenced.

For example, acoustic influencing which is adaptive to the rotational speed can be achieved by way of a partial mass distribution of the tuning element, to be precise, in particular, by virtue of the fact that centrifugal forces either increase or reduce the tuning element prestress on account of a rotational speed of the clutch, in particular of the outer clutch part.

The tuning element can be applied to the outer clutch part substantially without prestress, with the result that the prestress can be substantially zero. As an alternative, the tuning element can be applied with prestress to the outer clutch part, in particular can be clamped onto it.

It is possible that the tuning element is shrink-fitted thermally and/or chemically onto the outer clutch part. As an alternative or in addition, the tuning element can be prestressed mechanically onto the outer clutch part.

The tuning element is preferably a substantially annular tuning ring.

The outer clutch part is preferably of substantially annular configuration.

The inner clutch part is preferably of substantially annular configuration.

The clutch is preferably a multiple disc clutch, with the result that multiple disc assemblies can be arranged between the outer clutch part and the inner clutch part; preferably, in each case one multiple disc assembly can be connected in a positively locking manner to the outer clutch part and one multiple disc assembly can be connected in a positively locking manner to the inner clutch part. It is possible that a transmission of force takes place from the outer clutch part via the multiple disc assemblies to the inner clutch part when the multiple disc assemblies are pressed against one another. It is possible that the outer clutch part serves as clutch output and the inner clutch part serves as clutch drive or vice versa.

It is to be mentioned once again that the tuning element, in particular in a material-induced and/or geometry-induced manner, expediently serves to influence the acoustic behaviour of the clutch, to be precise preferably by means of influencing the join damping between the tuning element and the outer clutch part, and the stiffness and/or the mass of the arrangement which comprises the outer clutch part and the tuning element.

The clutch serves, in particular, to transmit torques, for example vibratory torques, with, in particular, a pronounced rotational irregularity between an engine and a drive unit.

BRIEF DESCRIPTION OF THE DRAWINGS

The above-described features and embodiments of the present disclosure can be combined with one another. Other advantageous developments of the present disclosure are disclosed in the subclaims or result from the following description of preferred embodiments in conjunction with the appended figures, in which:

FIG. 1 shows a perspective view of a clutch K according to one embodiment of the present disclosure. The clutch K will be described in the following text with common reference to FIGS. 1 to 3.

DETAILED DESCRIPTION

Figure 1:
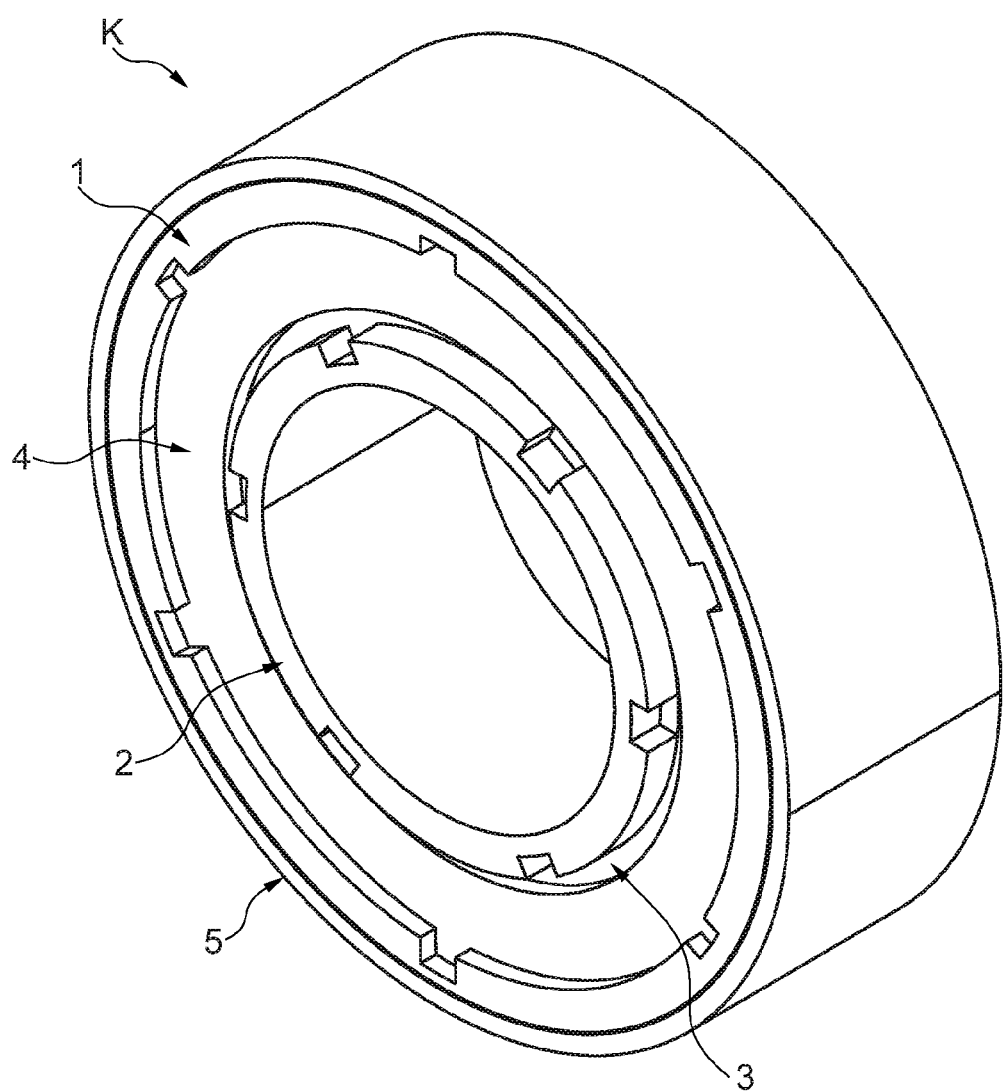
FIG. 1 shows a perspective view of a clutch according to one embodiment of the present disclosure.
Figure 2:
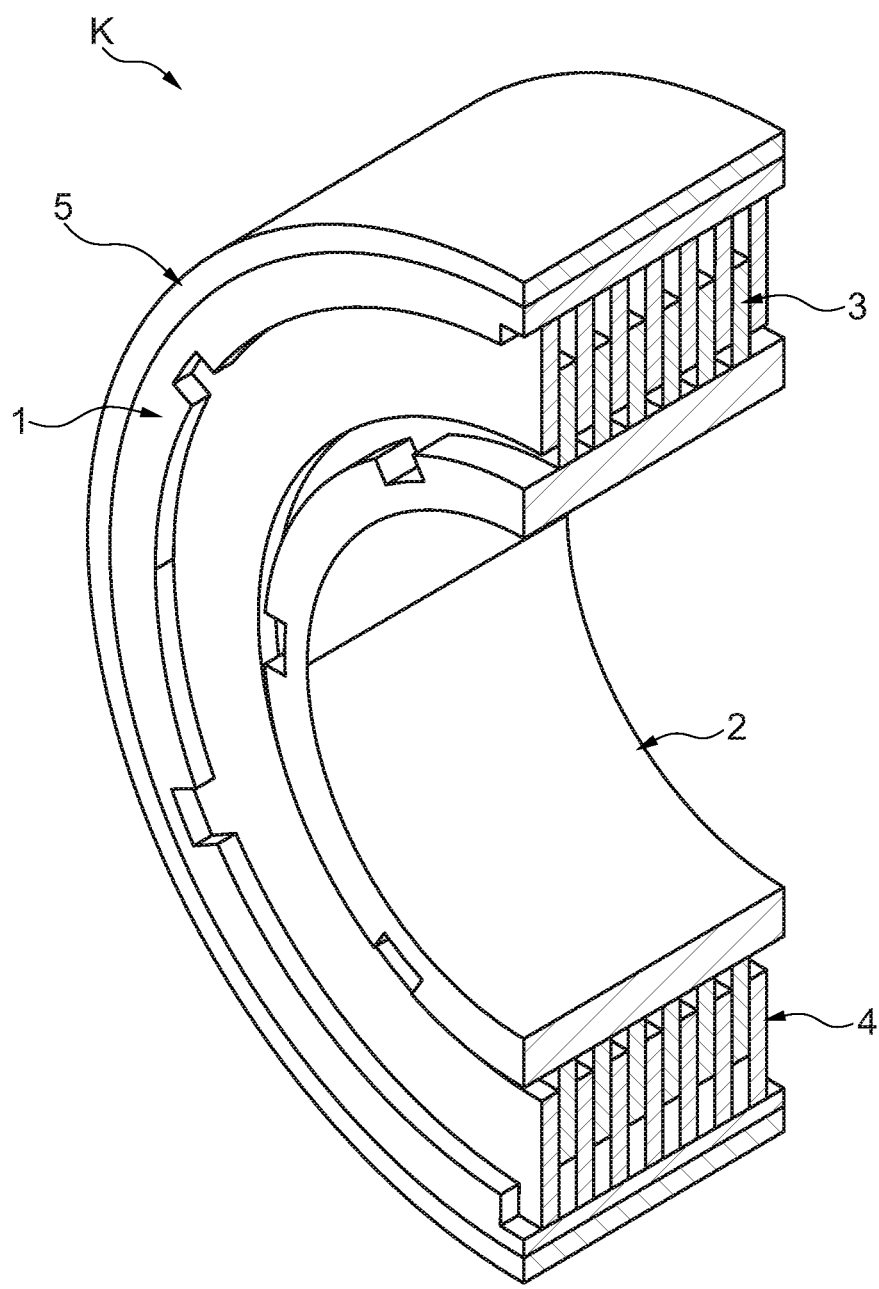
FIG. 2 shows a perspective sectional view of the clutch from FIG. 1.
Figure 3:
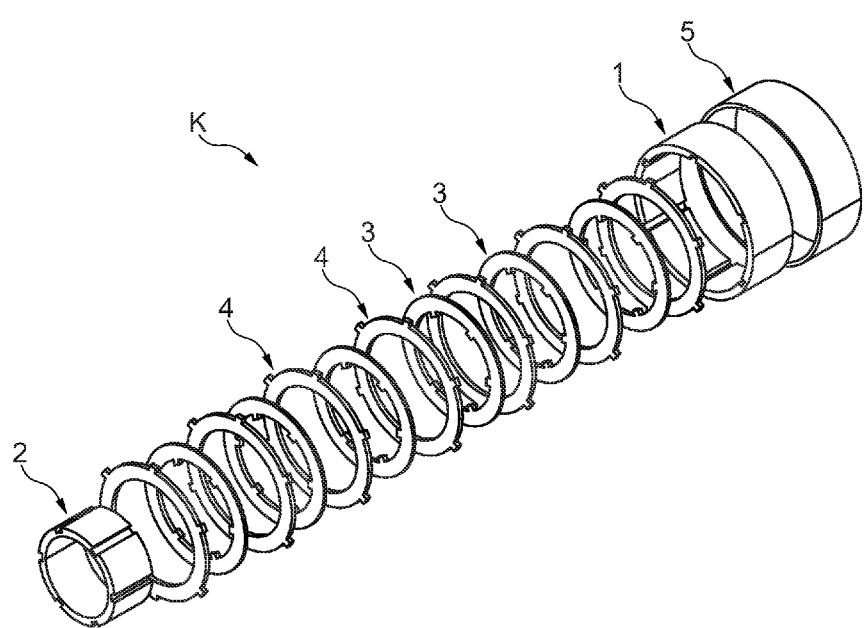
FIG. 3 shows a perspective, exploded view of the clutch from FIGS. 1 and 2.

With reference to FIG. 1, the clutch K is configured as a multiple disc clutch (either dry or in an oil bath) having an expediently annular clutch pot 1 (outer clutch part) and an expediently annular clutch hub 2 (inner clutch part). Multiple disc assemblies 3 and 4 which are likewise expediently of annular configuration are connected between the clutch pot 1 and the clutch hub 2. The multiple disc assembly 4 is connected in a positively locking manner to the clutch pot 1, and the multiple disc assembly 3 is connected in a positively locking manner to the clutch hub 2. If the multiple disc assemblies 3 and 4 are pressed against one another, a transmission of force takes place from the clutch pot 1 via the multiple disc assemblies 3 and 4 to the clutch hub 2. In order to make switching of the clutch K possible in order to produce and to disconnect the non-positive connection, there is a radial play in the positively locking connections in the positively locking connections of the multiple disc assemblies 3 and 4 to the clutch pot 1 and the clutch hub 2.

The radial play can produce alternating contact of the components which are connected in a positively locking manner, which leads to undesired, for example knocking, noise between the flanks of the positively locking connections. Above all, the clutch pot 1 emits frequency components as a result of transient excitation, which frequency components are dependent, in particular directly, on the natural modes, natural frequencies and the modal damping of the said natural modes, and correlate with the structure-borne sound components which are produced.

The clutch K is therefore provided with a tuning ring 5 (tuning element) in order to influence the acoustic behaviour of the clutch K, in particular the clutch pot 1. The tuning ring 5 encases the clutch pot 1 and is applied to the clutch pot 1, expediently in a manner which is direct and involves friction, for example with prestress or substantially without prestress.

Oscillating systems, such as the clutch K for example, can be modally described discretely by way of a matrix of n*m coupled spring/mass systems.

Abovementioned natural modes can be put out of tune by means of the tuning element 5 in such a way that preferred functional or operating noise is achieved by virtue of the fact that the acoustic behaviour of the clutch pot 1 is configured particularly by way of the damping of the natural modes and frequencies. This configuration takes place substantially by way of the targeted influencing of the pulse loading and the modulation of individual frequency groups. Furthermore, emphasis and suppression of defined, application-related frequency groups can be aimed for by virtue of the fact that, as a result, the degree of fluctuation and the roughness of the emitted overall clutch noise can be set by way of the influencing of the modal parameters by way of material and join location damping (join damping) and the modulus of elasticity and/or shear modulus of the tuning element 5.

By means of the tuning ring 5, the mass, stiffness and damping matrices of the clutch pot 1 which are produced by way of material and join damping and the modulus of elasticity and the shear modulus can be influenced, independently of its material properties, in such a way that the modal parameters of the combination of outer clutch part 1/tuning element 5 preferably change to the extent that the psycho-acoustic parameters overall lead to preferred functional and operating noise and/or undesired noise is reduced.

In order to achieve this, in particular independently of the material properties of the clutch pot 1, the tuning ring 5 is applied to the clutch pot 1 in such a way that the join damping between the tuning ring 5 and the clutch pot 1 can be set by way of the coefficient of friction between them and by means of tangential tension in the clutch pot 1 and in the tuning ring 5. This leads to direct influencing of the damping matrix of the overall arrangement. In addition, the damping matrix of the arrangement comprising the outer clutch part 1 and the tuning ring 5 is preferably selected by way of the selection of the material (in particular, raw material) of the tuning ring 5 and its specific material damping.

Furthermore, the tangential prestress of the tuning ring 5 and elastic characteristic variables (for example, modulus of elasticity) of the material (in particular, raw material) of the tuning ring 5 can influence the stiffness matrix of the arrangement of the outer clutch part 1/tuning ring 5.

A different partial mass distribution and layer thickness of the tuning ring 5 can lead to influencing of the mass matrix.

The tuning ring 5 is preferably configured from an elastomer or a thermoset or thermoplastic material or both. The addition of filling and/or strength-increasing additives and/or fibres can likewise bring about desired, preferably psycho-acoustic properties.

It is possible that the tangential prestress takes place, for example, by way of a tuning ring 5, for example in the form of a shrink-fit hose, which is placed loosely on to the clutch pot 1 and is shrink-fitted onto the clutch pot 1 by way of thermal and/or chemical treatment. A mechanical prestress is likewise possible.

The prestress of the tuning ring 5 can also assume the value of substantially zero, with the result that only the material damping and/or the partial mass distribution of the tuning ring 5 are/is brought to bear.

Moreover, adaptation of the psycho-acoustic configuration of the functional and operating noise which is adaptive to the rotational speed can be achieved by virtue of the fact that the tangential tension is counteracted directly and/or indirectly by way of centrifugal forces.

As an alternative or in addition, a temperature-dependent adaptation of the noise emission can be achieved via an adaptation of the thermodynamic properties of the tuning ring 5.

The present disclosure is not restricted to the above-described preferred embodiments. Rather, a multiplicity of variants and modifications are possible which likewise make use of the concept of the present disclosure and therefore fall within the scope of protection. Moreover, the present disclosure also claims protection for the subject matter and the features of the subclaims independently of the features and claims which are referred to.

The invention claimed is:

1. A multiple disc clutch comprising:
   an outer clutch part,
   an inner clutch part, operably associated with the outer clutch part;
   multiple disc assemblies arranged between the outer clutch part and the inner clutch part; and
   a tuning element encasing the outer clutch part and influencing the acoustic behaviour of the multiple disc clutch.

2. The multiple disc clutch according to claim 1, wherein the tuning element is friction fit to the outer clutch part.

3. The multiple disc clutch according to claim 1, wherein the tuning element is applied to the outer clutch part in such a way that join damping between the outer clutch part and the tuning element is influenced by way of the coefficient of friction.

4. The multiple disc clutch according to claim 1, wherein the tuning element is applied to the outer clutch part in such a way that join damping between the outer clutch part and the tuning element is influenced by means of tangential tension in the outer clutch part and the tuning element.

5. The multiple disc clutch according to claim 1, wherein the tuning element is configured from at least two different materials.

6. The multiple disc clutch according to claim 1, wherein the tuning element is comprised of at least one of the following:
   a) an elastomer or different elastomers,
   b) a thermoset material or different thermoset materials, or
   c) a thermoplastic material or different thermoplastic materials.

7. The multiple disc clutch according to claim 6, wherein the tuning element is further comprised of one or more items selected from the group consisting of a material additive, a strength-increasing additive, and fibres.

8. The multiple disc clutch according to claim 1, wherein the tuning element comprises different layer thicknesses.

9. The multiple disc clutch according to claim 1, wherein the tuning element has a partial mass distribution.

10. The multiple disc clutch according to claim 1, wherein the tuning element is applied to the outer clutch part substantially without prestress.

11. The multiple disc clutch according to claim 1, the tuning element is applied to the outer clutch part with prestress.

12. The multiple disc clutch according to claim 1, wherein tuning element is shrink-fitted thermally or chemically onto the outer clutch part.

13. The multiple disc clutch according to claim 1, wherein the tuning element is prestressed mechanically onto the outer clutch part.

14. The multiple disc clutch according to claim 1, wherein the tuning element is a tuning ring, and the outer clutch part or the inner clutch part is preferably of annular configuration.

\* \* \* \* \*